(12) United States Patent
Wu et al.

(10) Patent No.: US 10,673,107 B2
(45) Date of Patent: Jun. 2, 2020

(54) ELECTROLYTE COMPOSITION, AND ENERGY STORAGE DEVICE EMPLOYING THE SAME

(71) Applicant: Industrial Technology Research Institute, Hsinchu (TW)

(72) Inventors: Ching-Chen Wu, Taichung (TW); Chang-Chung Yang, Taipei (TW); Chun-Hsing Wu, Taipei (TW); Wen-Sheng Chang, Pingtung (TW); Kan-Lin Hsueh, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 863 days.

(21) Appl. No.: 14/935,123

(22) Filed: Nov. 6, 2015

(65) Prior Publication Data

US 2017/0005352 A1   Jan. 5, 2017

(30) Foreign Application Priority Data

Jun. 30, 2015   (TW) .............................. 104121067 A

(51) Int. Cl.
*H01M 8/10* (2016.01)
*H01M 12/08* (2006.01)
(Continued)

(52) U.S. Cl.
CPC ........... *H01M 12/08* (2013.01); *H01M 4/366* (2013.01); *H01M 4/38* (2013.01); *H01M 4/62* (2013.01);
(Continued)

(58) Field of Classification Search
CPC .......... H01M 4/38; H01M 4/62; H01M 4/381; H01M 4/382; H01M 4/625; H01M 4/626;
(Continued)

(56) References Cited

U.S. PATENT DOCUMENTS

| 5,145,752 A | 9/1992 | Goldstein et al. |
| 5,190,833 A | 3/1993 | Goldstein et al. |

(Continued)

FOREIGN PATENT DOCUMENTS

| CN | 1992420 A | 7/2007 |
| CN | 102959767 A | 3/2013 |

(Continued)

OTHER PUBLICATIONS

Office Action dated Jun. 5, 2018 in corresponding Chinese application No. 2015105223833.

(Continued)

*Primary Examiner* — Lingwen R Zeng
(74) *Attorney, Agent, or Firm* — Birch, Stewart, Kolasch & Birch, LLP

(57) ABSTRACT

An electrolyte composition and an energy storage device employing the same are provided. The electrolyte composition includes a solid and a solution. The solid includes a core and a metal layer encapsulating the core, where the metal layer is selected from a group consisting of Zn, Al, Mg, Li, Na and the metal oxides thereof. In particular, the solid has a first density and the solution has a second density, and the ratio between the first density and the second density is from about 0.97 to 1.03.

21 Claims, 5 Drawing Sheets

(51) Int. Cl.
- *H01M 4/36* (2006.01)
- *H01M 4/62* (2006.01)
- *H01M 4/38* (2006.01)
- *H01M 4/02* (2006.01)
- *H01M 8/22* (2006.01)

(52) U.S. Cl.
CPC ............ *H01M 4/381* (2013.01); *H01M 4/382* (2013.01); *H01M 4/625* (2013.01); *H01M 4/626* (2013.01); *H01M 8/225* (2013.01); *H01M 2004/021* (2013.01); *H01M 2004/027* (2013.01); *H01M 2300/0014* (2013.01); *Y02E 60/128* (2013.01)

(58) Field of Classification Search
CPC ............... H01M 4/366; H01M 8/225; H01M 2300/0014; H01M 12/08; H01M 2004/021; H01M 2004/027; Y02E 60/128
USPC ........................................................ 429/403
See application file for complete search history.

(56) References Cited

U.S. PATENT DOCUMENTS

| | | | |
|---|---|---|---|
| 5,196,275 | A | 3/1993 | Goldman et al. |
| 5,360,680 | A | 11/1994 | Goldman et al. |
| 5,434,020 | A | 7/1995 | Cooper |
| 5,849,427 | A | 12/1998 | Siu et al. |
| 8,309,254 | B2 | 11/2012 | Hwang et al. |
| 8,563,172 | B2 | 10/2013 | Kwon et al. |
| 8,574,771 | B2 | 11/2013 | Kim et al. |
| 8,722,226 | B2 | 5/2014 | Chiang et al. |
| 8,722,227 | B2 | 5/2014 | Chiang et al. |
| 8,785,020 | B2 | 7/2014 | Kwon et al. |
| 8,906,555 | B2 | 12/2014 | Hwang et al. |
| 2007/0154810 | A1 | 7/2007 | Kim et al. |
| 2010/0047671 | A1 | 2/2010 | Chiang et al. |
| 2010/0209779 | A1 | 8/2010 | Wendman |
| 2010/0285359 | A1 | 11/2010 | Hwang et al. |
| 2010/0323264 | A1 | 12/2010 | Chiang et al. |
| 2011/0189520 | A1* | 8/2011 | Carter ................. B60L 11/1879 429/107 |
| 2011/0274954 | A1 | 11/2011 | Cho et al. |
| 2012/0148918 | A1 | 6/2012 | Kwon et al. |
| 2012/0295144 | A1 | 11/2012 | Kwon et al. |
| 2013/0065131 | A1 | 3/2013 | Hwang et al. |
| 2013/0244087 | A1 | 9/2013 | Ma et al. |
| 2013/0252031 | A1 | 9/2013 | Ma et al. |
| 2013/0337327 | A1 | 12/2013 | Sun et al. |
| 2014/0042989 | A1 | 2/2014 | Gogotsi et al. |
| 2014/0072879 | A1 | 3/2014 | Chen et al. |
| 2014/0186678 | A1 | 7/2014 | Kim et al. |
| 2014/0227574 | A1 | 8/2014 | Savinell et al. |
| 2014/0234712 | A1 | 8/2014 | Rojeski |

FOREIGN PATENT DOCUMENTS

| | | |
|---|---|---|
| CN | 103181002 A | 6/2013 |
| CN | 103872349 A | 6/2014 |
| CN | 103748709 A | 4/2017 |
| EP | 2 684 734 A1 | 1/2014 |
| EP | 2 715 841 | 4/2014 |
| WO | WO 2012/167057 A2 | 12/2012 |

OTHER PUBLICATIONS

Lee et al., "Composite gel polymer electrolytes containing core-shell structured $SiO_2(Li+)$ particles for lithium-ion polymer batteries," Electrochemistry Communications, vol. 17, 2012 (Available online Jan. 12, 2012), pp. 18-21.

Taiwanese Notice of Allowance and Search Report for Taiwanese Application No. 104121067, dated May 10, 2016.

Wu et al., "High performance composite solid polymer electrolyte systems for electrochemical cells," Journal of Power Sources, vol. 244, 2013 (Available online Jan. 16, 2013), pp. 287-293.

Yang et al., "Nanotechnology—Introduction of Energy Storage Technology Development and Zinc-air Secondary Battery," Taiwan Nano Newsletter, Dec. 2014, pp. 7-16 (11 pages total), with a partial English translation.

Campos et al., "Investigation of carbon materials for use as a flowable electrode in electrochemical flow capacitors", Electrochimica Acta 98 (2013), pp. 123-130.

Hatzell et al., "A high performance pseudocapacitive suspension electrode for the electrochemical flow capacitor", Electrochimica Acta 111 (2013), pp. 888-897.

Song et al., "A novel activation for electroless plating on preparing Ni/PS microspheres", Materials Letters 63 (2009), pp. 282-284.

* cited by examiner

ELECTROLYTE COMPOSITION, AND ENERGY STORAGE DEVICE EMPLOYING THE SAME

CROSS REFERENCE TO RELATED APPLICATIONS

The application is based on, and claims priority from, Taiwan Application Serial Number 104121067, filed on Jun. 30, 2015, the disclosure of which is hereby incorporated by reference herein in its entirety.

TECHNICAL FIELD

The technical field relates to an electrolyte composition, and an energy storage device employing the electrolyte composition.

BACKGROUND

Metal-air batteries have long been a subject of research since they can be used in many applications, both as small batteries for watches, acoustical devices, etc., and as bigger batteries suitable for electric vehicles.

During the discharge of metal-air batteries, oxygen from the atmosphere is converted to hydroxyl ions in the air electrodes. The reaction in the air electrodes involves the reduction of oxygen, the consumption of electrons, and the production of hydroxyl ions. The hydroxyl ions migrate through the electrolyte towards the metal-negative electrode, where oxidation of the metal of the negative electrode occurs, forming oxides and liberating electrons. In a secondary (i.e., rechargeable) metal-air battery, charging converts hydroxyl ions to oxygen in the air electrode, releasing electrons. At the metal electrode, the metal oxides or ions are reduced to form the metal while electrons are consumed.

Metal-air batteries provide significant energy-capacity benefits. For example, metal-air batteries have several times the energy storage density of lithium-ion batteries, while using globally abundant and low-cost metals (e.g. zinc) as an energy storage medium. The technology is relatively safe (non-flammable) and environmentally friendly (non-toxic and recyclable materials may be used).

SUMMARY

According to an embodiment of the disclosure, the disclosure provides an electrolyte composition including a solid and a solution, wherein the solid includes a substrate and a metal layer covering the substrate. The metal layer can be selected from a group consisting of Zn, Al, Mg, Li, Na and the metal oxide compounds thereof. The solid has a first density, and the solution has a second density, wherein the ratio between the first density and the second density is from about 0.97 to 1.03.

According to another embodiment of the disclosure, the disclosure provides an energy storage device including an anode, a cathode, an isolation membrane disposed between the anode and the cathode, and the aforementioned electrolyte composition.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
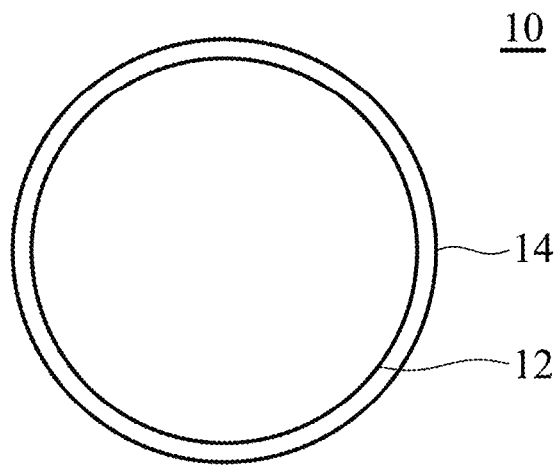
FIGS. 1 and 2 are cross-sectional views of the solid employed by the electrolyte composition according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to embodiments of the disclosure, the disclosure provides an electrolyte composition, includes a solid (such as a material with a core-shell structure) and a solution. Since the density of the solid is controlled to be similar to the density of the solution, the solid can be suspended within the solution, and be mobile in the electrolyte composition. Furthermore, the reacted solid would float at the top level of the electrolyte and separate from the non-reacted solid, thereby facilitating the charging of the battery employing the electrolyte composition. In addition, the solid of the electrolyte composition of the disclosure can be a material having a core-shell structure (such as a single layer or multilayer core-shell structure). Furthermore, the solid can be formed by electroless plating, electroplating, or a combination thereof. Therefore, the solid can be fabricated rapidly, massively, and cheaply. On the other hand, due to the good fluidity, the electrolyte composition of the disclosure can be a slurry electrolyte composition, resulting in high performance and practicability of the battery employing the electrolyte.

According to embodiments of the disclosure, the disclosure provides an electrolyte composition including a solid, and a solution. The solid includes a substrate and a metal layer covering the substrate, wherein the metal layer is selected from a group consisting of Zn, Al, Mg, Li, Na and the metal oxides thereof. The thickness of the metal layer can be modified in order to force the solid being suspended within the solution, resulting in the electrolyte composition having a good fluidity. In particular, the solid has a first density and the solution has a second density, and the ratio between the first density and the second density is from about 0.97 to 1.03, such as from 0.98 to 1.02.

According to embodiments of the disclosure, the substrate can be a conductive material, or a non-conductive material. The conductive material can be conductive polymer, carbon material, or a combination thereof. wherein, the conductive polymer can be polyaniline (PANI), polyphenylene sulfide (PPS), polypyrrole (PPY), poly(p-phenylene) (PPP), polythiophene (PT), poly(p-phenylene vinylene) (PPV), polyfluorene (PF), polyacetylene (PA), or a combination thereof; and, the carbon material can be carbon nanotube, carbon capsule, carbon fiber, or a combination thereof.

In addition, the non-conductive material can be polymer material, inorganic material, or a combination thereof. For example, the inorganic material can be titanium oxide, zirconium oxide, silicon oxide, zeolite, or a combination thereof. The polymer material can be polycarbonate (PC), polyethylene terephthalate, polyethylene (PE), polyvinylchloride (PVC), polypropylene (PP), polyacrylonitrile, phenol-formaldehyde resin, melamine formaldehyde resin, polystyrene (PS), polymethylmethacrylate (PMMA), or a combination thereof.

According to embodiments of the disclosure, the solid can have a spherical shape, elongated shape, polyhedral shape, or a combination thereof. For example, the solid can be a sphere or a spheroid. As shown in FIG. 1, the solid 10 has a substrate 12 serving as a core, and a metal layer 14 covering the substrate 12. The spherical solid can have a sphericity between 0.4 and 1, and the substrate serving as the core can also have a sphericity between 0.4 and 1. Furthermore, the substrate has a particle size of between 50 nm and 10 μm. The term ⌈sphericity⌋ of the disclosure refers to an average of a ratio (DS/DL) of a maximum diameter (DL) to a short diameter (DS) orthogonal to the maximum diameter of arbitrary particles in a photographic projection image obtained by taking a photograph with a transmission electron microscope. The metal layer 14 can have a minimum thickness of 10 nm. When the thickness of the metal layer 14 is less than 10 nm, the metal layer 14 is apt to be peeled easily from the substrate, resulting in a solid with an incomplete core-shell structure (i.e. the substrate 12 does not be completely covered by the metal layer 14). In addition, when the thickness of the metal layer 14 is too large, it is difficult to maintain the density of the solid within a specific range. For example, the thickness the metal layer 14 can be modified to force the solid to have a density from 1.5 to 6. In addition, since the outermost layer of the solid of the disclosure is an active metal layer, the outermost metal layer of the solid would transfer to metal ions during the discharging of the battery (such as a metal-air battery) employing the electrolyte composition. As a result, the thickness of the outermost metal layer and the density of the solid are generally reduced. On the other hand, the metal ions within the solution would transfer to metal layer during the charging of the battery (such as a metal-air battery) employing the electrolyte composition, thereby increasing the thickness of the metal layer and the density of the solid. As a result, the users can easily understand whether the battery completely charged or discharged by determining the condition of the solid suspended with the solution.

Figure 2:
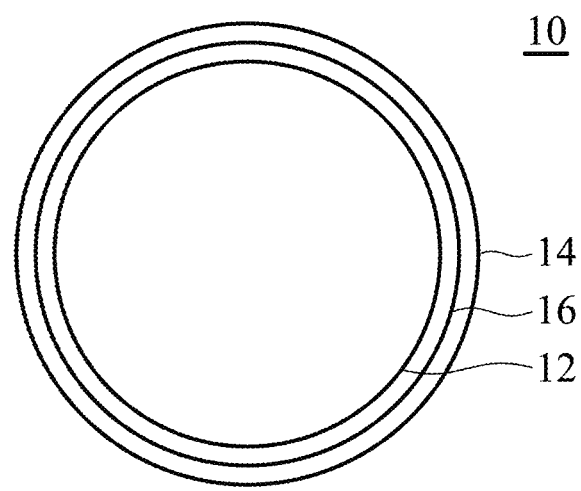

According to other embodiments of the disclosure, as shown in FIG. 2, the solid of the disclosure 10 can further include a conductive layer 16 disposed between the substrate 12 and the metal layer 14. The conductive layer 16 can be a conductive material having acid and alkali resistance, such as Ni, Ti, Sn, or conductive polymer. The purpose of forming the conductive layer 16 is to form an electron conductive pathway when the solids contact each other, thereby introducing the electrons into the collector plate via the electron conductive pathway. The method for forming the metal layer or the conductive layer can be electroless plating, electroplating, or a combination thereof. For example, the solid of the disclosure can be formed by following steps: First, a substrate is provided, and the substrate can be subjected to a surface activation or acidification in advance. In addition, the substrate can also have a metal layer and/or conductive layer of the disclosure formed to cover the substrate in advance. Next, a plating solution is provided, wherein the plating solution includes a metal precursor, pH stabilizer (such as: $NH_4Cl$)), and metal complexing agent (such as: sodium citrate), wherein the metal precursor can be metal chloride, metal sulfate, metal nitrate, metal acetate, or a combination thereof. Next, the pH value of the plating solution is adjusted to be between 3 and 6 (such as between 4 and 5.9), in order to force the metal precursor of the plating solution reacting with the complexing agent to form metal complex instead of precipitation. Next, the substrate and a reducing agent are added into the plating solution to obtain a mixture. Next, the mixture is stirred at a specific temperature (such as between room temperature and 100° C.) for a reaction time (such as between several minutes and several hours). Finally, the plating solution is subjected to centrifugation via a centrifuge, obtaining the solid of the electrolyte composition of the disclosure.

According to other embodiments of the disclosure, the density of the solid can be adjusted by modifying the metal precursor concentration, pH value of the plating solution, concentration of the reducing agent, type of the reducing agent, reaction temperature, reaction time, and plating times, in order to ensure that the density of the solid is close to the solution of the electrolyte composition. Therefore, the solid of the disclosure can be suspended within the solution.

According to some embodiments of the disclosure, the solution of the electrolyte composition can include a solvent, and a solute, wherein the solute can include metal oxide compound, alkaline compound, or a combination thereof. The solvent can be water. The alkaline compound can be sodium carbonate, potassium carbonate, sodium bicarbonate, sodium hydroxide, potassium hydroxide, tetra-methyl ammonium hydroxide (TMAH), or a combination thereof; and, the metal oxide compound can be zinc oxide, aluminum oxide, magnesium oxide, lithium oxide, sodium oxide, or a combination thereof. The solution can be a basic solution due to the addition of the alkaline compound, and the alkaline compound can promote the metal oxide compound to dissolve in the solvent.

In addition, the density of the solution can also be adjusted by adding a soluble metal oxide compound, in order to ensure that the density of the solution is close to the solid of the electrolyte composition. Therefore, the solid of the disclosure can be suspended within the solution. In particular, the concentration of the alkaline compound in the solution can be between about 0.5M and 10M, depending on the desired alkalinity of the solution. In addition, the metal oxide compound can have a weight percent between about 5 wt % and 50 wt %, based on the weight of the solvent.

Figure 3:
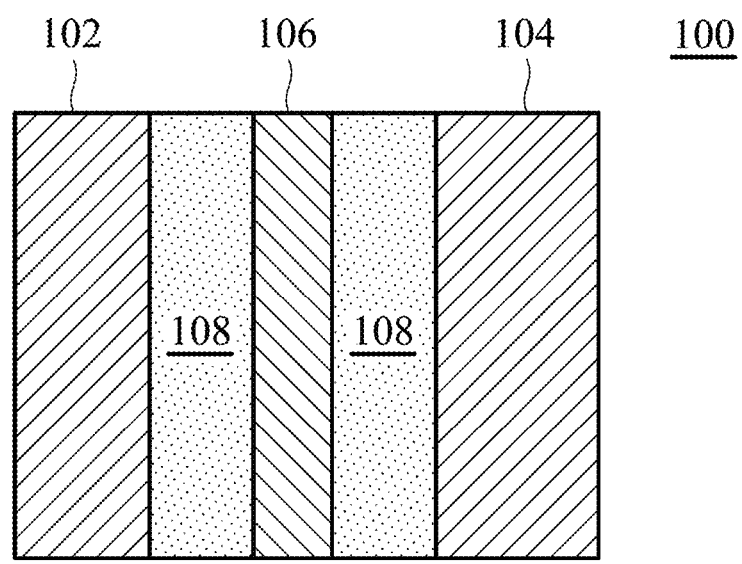
FIG. 3 is a schematic diagram of the energy storage device according to an embodiment of the disclosure.

According to some embodiments of the disclosure, as shown in FIG. 3, the disclosure provides an energy storage device 100 including an anode 102; a cathode 104; an isolation membrane 106 disposed between the anode and the cathode; and the aforementioned electrolyte composition 108. For example, the energy storage device 100 can be a metal-air battery, and the anode 102 can be a metal electrode such as zinc electrode (with a purity between 85 wt % and 99.999 wt %) or zinc alloy electrode. When the anode 112 is a zinc alloy electrode, the zinc alloy electrode can include (but not limited to) at least one metal of magnesium, iron, copper, calcium, bismuth, indium, zinc, gallium, tin, cadmium, germanium, antimony, selenium, thallium or mercury. In addition, the cathode 104 can be an air battery cathode including a catalyst (such as manganese oxide, cobalt oxide, or catalyst of Pt/C). Furthermore, ambient air can be introduced into the battery via the cathode. The isolation membrane 106 can prevent the anode 102 from contacting the cathode 104. The material of the isolation membrane 106 is not limited and can be any suitable material.

Below, exemplary embodiments will be described in detail so as to be easily realized by a person having ordinary knowledge in the art. The disclosure concept may be embodied in various forms without being limited to the exemplary embodiments set forth herein. Descriptions of well-known parts are omitted for clarity.

Solid of the Electrolyte Composition

Preparation Example 1

Polystyrene (PS) particles (with an average particle size of about 300 nm) and an aqueous solution containing tin chloride ($SnCl_2$) (0.1 wt %) were added into a reaction bottle, and the reaction bottle was disposed into a ultrasonic vibration generator. After shaking at room temperature for 10 minutes, the aqueous solution containing tin chloride ($SnCl_2$) was removed, and then water was added into the reaction bottle. After shaking at room temperature for 10 minutes, water was removed from the reaction bottle. Next, an aqueous solution containing palladium chloride ($PdCl_2$) (0.1 wt %) was added into the reaction bottle. Next, after shaking at room temperature for 10 minutes, the aqueous solution containing palladium chloride ($PdCl_2$) was removed, and then water was added into the reaction bottle. After shaking at room temperature for 10 minutes, the water in the reaction bottle was removed. After drying, polystyrene particles with active surface were obtained.

Preparation Example 2

Nickel chloride ($NiCl_2$), sodium citrate ($NaC_6H_8O_7$), ammonium chloride ($NH_4Cl$), and 40 mL of deionized water were added into the reaction bottle, obtaining a plating solution. The concentrations of nickel chloride ($NiCl_2$), sodium citrate ($NaC_6H_8O_7$), ammonium chloride ($NH_4Cl$) in the plating solution were 0.2M, 0.4M, and 0.6M respectively. Next, the pH value of the plating solution was adjusted to 5.9 by means of the addition of hydrochloric acid aqueous solution or sodium hydroxide aqueous solution (with a concentration of 1M). Next, the reaction bottle was disposed into a ultrasonic vibration generator and heated to 60° C. Next, the polystyrene particle with active surface (Preparation Example 1) was added into the plating solution. Next, 60 mL of disodium hydrogen phosphate ($Na_2HPO_2$) aqueous solution (0.2M) serving as reducing agent was dropwisely added into the reaction bottle at a rate of 1 mL/min. After the addition of the disodium hydrogen phosphate ($Na_2HPO_2$) was complete, the mixture was stirred for 1 hour. Finally, the mixture was subjected to centrifugation via a centrifuge, obtaining the solid (the polystyrene particle covered with a nickel layer). Next, the solid was analyzed by scanning electron microscope (SEM), and the result was shown in Table 1.

Preparation Example 3

Preparation Example 3 was performed in the same manner as in Preparation Example 2 except that the concentration of the nickel chloride ($NiCl_2$) was increased from 0.2M to 0.4M, and the pH value of the plating solution was adjusted to 4.8, obtaining the solid (the polystyrene particle covered with a nickel layer). Next, the solid was analyzed by scanning electron microscope (SEM), and the result was shown in Table 1.

Preparation Example 4

Preparation Example 4 was performed in the same manner as in Preparation Example 2 except that the concentration of the nickel chloride ($NiCl_2$) was increased from 0.2M to 0.6M, and the pH value of the plating solution was adjusted to 4.2, obtaining the solid (the polystyrene particle covered with a nickel layer). Next, the solid was analyzed by scanning electron microscope (SEM), and the result was shown in Table 1.

TABLE 1

| | $NiCl_2$ | $NaC_6H_8O_7$ | $NH_4Cl$ | pH | reducing ($Na_2HPO_2$) | morphology of the polystyrene particle covered with the nickel layer |
|---|---|---|---|---|---|---|
| Preparation Example 2 | 0.2M | 0.4M | 0.6M | 5.9 | 0.4M | the nickel layer did not cover the surface of the polystyrene particle completely |
| Preparation Example 3 | 0.4M | | | 4.8 | | a uniform nickel layer covering the surface |
| Preparation Example 4 | 0.6M | | | 4.2 | | the nickel layer had a larger roughness |

Figure 4:
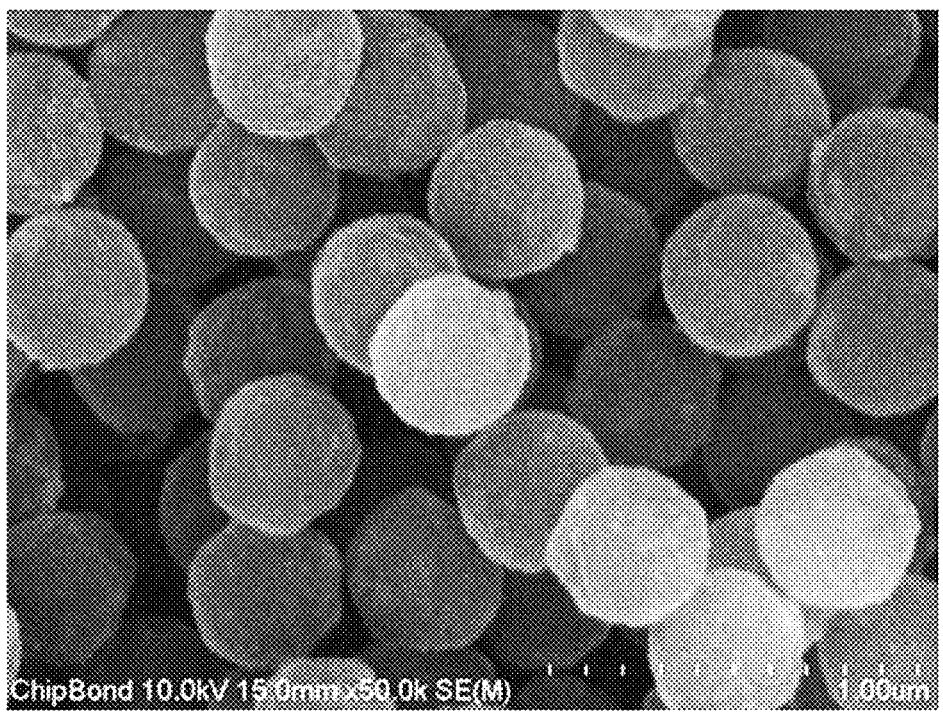
FIG. 4 is scanning electron microscope (SEM) photograph of the styrene sphere coated with nickel layer as disclosed in Preparation Example 3.

As shown in Table 1, the solid (the polystyrene particle covered with a nickel layer) of the disclosure can be prepared from Preparation Example 2-4. The nickel layer has a uniform thickness and covered the whole surface of the polystyrene particle. Furthermore, when the concentrations of nickel chloride ($NiCl_2$), sodium citrate ($NaC_6H_8O_7$), ammonium chloride ($NH_4Cl$) in the plating solution are 0.4M, 0.4M, and 0.6M respectively, the solid has a uniform nickel layer covering the polystyrene particle as shown in FIG. 4, which is the scanning electron microscope (SEM) spectrum of the solid as disclosed in Preparation Example 3.

Preparation Example 5

Preparation Example 5 was performed in the same manner as in Preparation Example 3 except that the concentration of the sodium citrate ($NaC_6H_8O_7$) was increased from 0.4M to 0.5M, and the pH value of the plating solution was adjusted to 4.3, and then the sheet-shaped precipitate was obtained, instead of the polystyrene particle with a nickel layer.

Preparation Example 6

Preparation Example 6 was performed in the same manner as in Preparation Example 3 except that the pH value of the plating solution was adjusted to 3, and then the sheet-shaped precipitate was obtained, instead of the polystyrene particle with a nickel layer.

Preparation Example 7

Preparation Example 7 was performed in the same manner as in Preparation Example 3 except that the pH value of the plating solution was adjusted to 4, obtaining the solid (the polystyrene particle covered with a nickel layer). Next, the solid was analyzed by scanning electron microscope (SEM), and a uniform nickel layer covering the polystyrene particle was observed.

Preparation Example 8

Preparation Example 8 was performed in the same manner as in Preparation Example 3 except that the pH value of the plating solution was adjusted to 5, obtaining the solid (the polystyrene particle covered with a nickel layer). Next, the solid was analyzed by scanning electron microscope (SEM). The nickel layer of the solid disclosed in Preparation Example 8 has a higher surface roughness in comparison with the solid disclosed in Preparation Example 3.

Preparation Example 9

Preparation Example 9 was performed in the same manner as in Preparation Example 7 except that the concentration of the reducing agent ($Na_2HPO_2$) was increased from 0.2M to 0.4M, obtaining the solid (the polystyrene particle covered with a nickel layer). Next, the solid was analyzed by scanning electron microscope (SEM). The nickel layer of the solid disclosed in Preparation Example 9 has a higher surface densification in comparison with the solid disclosed in Preparation Example 7.

Preparation Example 10

Preparation Example 10 was performed in the same manner as in Preparation Example 7 except that the concentration of the reducing agent ($Na_2HPO_2$) was increased from 0.2M to 0.6M, obtaining the solid (the polystyrene particle covered with a nickel layer). Next, the solid was analyzed by scanning electron microscope (SEM). The nickel layer of the solid disclosed in Preparation Example 10 has a higher surface roughness in comparison with the solid disclosed in Preparation Example 7.

Preparation Example 11

Preparation Example 11 was performed in the same manner as in Preparation Example 7 except that the reaction bottle was disposed into the ultrasonic vibration generator and heated to 40° C., obtaining the solid (the polystyrene particle covered with a nickel layer). Next, the solid was analyzed by scanning electron microscope (SEM). The nickel layer of the solid disclosed in Preparation Example 11 has a lower surface roughness in comparison with the solid disclosed in Preparation Example 7.

Example 1

Zinc chloride ($ZnCl_2$), sodium citrate ($NaC_6H_8O_7$), ammonium chloride ($NH_4Cl$), and 40 mL of deionized water were added into a reaction bottle, obtaining a plating solution. The concentrations of zinc chloride ($ZnCl_2$), sodium citrate ($NaC_6H_8O_7$), and ammonium chloride ($NH_4Cl$) in the plating solution were 0.2M, 1.0M, and 0.6M respectively. Next, the pH value of the plating solution was adjusted to 4 by means of the addition of hydrochloric acid aqueous solution or sodium hydroxide aqueous solution (with a concentration of 1M). Next, the reaction bottle was disposed into a ultrasonic vibration generator and heated to 40° C. Next, the solid disclosed in Preparation Example 9 was added into the plating solution. Next, 60 mL of disodium hydrogen phosphate ($Na_2HPO_2$) aqueous solution (0.4M) serving as reducing agent was dropwisely added into the reaction bottle at a rate of 1 mL/min. After the addition of the disodium hydrogen phosphate ($Na_2HPO_2$) was complete, the mixture was stirred for 1 hour. Finally, the mixture was subjected to centrifugation via a centrifuge, obtaining a solid (the polystyrene particle covered with a zinc/nickel composite layer). Next, the solid was analyzed by scanning electron microscope (SEM) and transmission electron microscope (TEM), and the results show the solid has a core-shell structure. The density of the solid was measured and is shown in Table 2, according to the thickness of the zinc layer and nickel layer shown in SEM and TEM spectra.

Example 2

Example 2 was performed in the same manner as in Example 1 except that the concentration of the zinc chloride ($ZnCl_2$) was increased from 0.2M to 0.4M, obtaining the solid (the polystyrene particle covered with a zinc/nickel composite layer). Next, the solid was analyzed by scanning electron microscope (SEM) and transmission electron microscope (TEM), and the density of the solid was measured and is shown in Table 2 according to SEM and TEM spectra.

Example 3

Example 2 was performed in the same manner as in Example 1 except that the concentration of the zinc chloride ($ZnCl_2$) was increased from 0.2M to 0.6M, obtaining the solid (the polystyrene particle covered with a zinc/nickel composite layer). Next, the solid was analyzed by scanning electron microscope (SEM) and transmission electron microscope (TEM), and the density of the solid was measured and is shown in Table 2 according to SEM and TEM spectra.

TABLE 2

| | $ZnCl_2$ | $NaC_6H_8O_7$ | $NH_4Cl$ | pH | reducing agent ($Na_2HPO_2$) | density (g/cm³) |
|---|---|---|---|---|---|---|
| Example 1 | 0.2M | 1M | 0.6M | 4 | 0.4M | 3.21 |
| Example 2 | 0.4M | | | | | 3.63 |
| Example 3 | 0.6M | | | | | 3.81 |

As shown in Table 2, the thickness of the zinc layer is directly proportional to the concentration of the zinc chloride in the plating solution. Furthermore, the density of the solid (the particle covered with the zinc/nickel composite layer) is also increased as the concentration of the zinc chloride increases.

Example 4

Example 4 was performed in the same manner as in Example 3 except that the pH value of the plating solution is reduced from 4 to 3, and then the sheet-shaped precipitate was obtained, instead of the polystyrene particle covered with a zinc/nickel composite layer.

Example 5

Example 5 was performed in the same manner as in Example 3 except that the pH value of the plating solution was increased from 4 to 5, obtaining the solid (the polystyrene particle covered with a zinc/nickel composite layer). Next, the solid was analyzed by scanning electron microscope (SEM) and transmission electron microscope (TEM), and the density of the solid was measured and is shown in Table 3 according to SEM and TEM spectra.

TABLE 3

| | $ZnCl_2$ | $NaC_6H_8O_7$ | $NH_4Cl$ | pH | reducing agent ($Na_2HPO_2$) | density ($g/cm^3$) |
|---|---|---|---|---|---|---|
| Example 3 | 0.6M | 1M | 0.6M | 4 | 0.4M | 3.81 |
| Example 4 | | | | 3 | | sheet-shaped precipitate |
| Example 5 | | | | 5 | | 3.89 |

As shown in Table 3, the density of the solid increases when increasing the pH value of the plating solution from 4 to 5. On the other hand, when reducing the pH value of the plating solution from 4 to 3, a lot of sheet-shaped precipitates are formed due to the violent reduction reaction of zinc, resulting in there being no polystyrene particle covered with the zinc/nickel composite layer formed in the reaction.

Example 6

Example 6 was performed in the same manner as in Example 2 except that the reaction bottle was disposed into the ultrasonic vibration generator and heated to 50° C., obtaining the solid (the polystyrene particle covered with a zinc/nickel composite layer). Next, the solid was analyzed by scanning electron microscope (SEM) and transmission electron microscope (TEM), and the density of the solid was measured and is shown in Table 4 according to SEM and TEM spectra.

Example 7

Example 7 was performed in the same manner as in Example 2 except that the reaction bottle was disposed into the ultrasonic vibration generator and heated to 60° C., obtaining the solid (the polystyrene particle covered with a zinc/nickel composite layer). Next, the solid was analyzed by scanning electron microscope (SEM) and transmission electron microscope (TEM), and the density of the solid was measured and is shown in Table 4 according to SEM and TEM spectra.

TABLE 4

| | $ZnCl_2$ | $NaC_6H_8O_7$ | $NH_4Cl$ | pH | reducing agent ($Na_2HPO_2$) | reaction temperature (° C.) | density ($g/cm^3$) |
|---|---|---|---|---|---|---|---|
| Example 2 | 0.4M | 1M | 0.6M | 4 | 0.4M | 40 | 3.63 |
| Example 6 | | | | | | 50 | 3.74 |
| Example 7 | | | | | | 60 | 3.98 |

As shown in Table 4, the thickness of the zinc layer is directly proportional to the reaction temperature. Furthermore, the density of the solid (the particle covered with the zinc/nickel composite layer) is also increased with increasing the reaction temperature of the plating process.

Example 8

Example 8 was performed in the same manner as in Example 7 except that the reaction bottle was stirred for 2 hours after the addition of the disodium hydrogen phosphate ($Na_2HPO_2$) was complete, obtaining the solid (the polystyrene particle covered with a zinc/nickel composite layer). Next, the solid was analyzed by scanning electron microscope (SEM) and transmission electron microscope (TEM), and the density of the solid was measured and is shown in Table 5 according to SEM and TEM spectra.

TABLE 5

| | $ZnCl_2$ | $NaC_6H_8O_7$ | $NH_4Cl$ | pH | reducing agent ($Na_2HPO_2$) | reaction time (hour) | density ($g/cm^3$) |
|---|---|---|---|---|---|---|---|
| Example 7 | 0.4M | 1M | 0.6M | 4 | 0.4M | 1 | 3.98 |
| Example 8 | | | | | | 2 | 4.16 |

As shown in Table 5, the thickness of the zinc layer is directly proportional to the reaction time. Furthermore, the density of the solid (the particle covered with the zinc/nickel composite layer) is also increased with increasing the reaction time of the plating process.

Example 9

Example 9 was performed in the same manner as in Example 7 except for substituting the solid disclosed in Example 7 for the polystyrene particle covered with the nickel layer (i.e. the solid as disclosed in Preparation Example 9), obtaining the solid (the polystyrene particle covered with a zinc/nickel composite layer). Namely, the solid as disclosed in Preparation Example 9 was plated with zinc by repeating the plating process disclosed in Example 7 twice. Next, the solid was analyzed by scanning electron microscope (SEM) and transmission electron microscope (TEM), and the density of the solid was measured and is shown in Table 6 according to SEM and TEM spectra.

Example 10

Example 10 was performed in the same manner as in Example 7 except for substituting the solid disclosed in Example 9 for the polystyrene particle covered with the nickel layer (i.e. the solid as disclosed in Preparation Example 9), obtaining the solid (the polystyrene particle covered with a zinc/nickel composite layer). Namely, the solid as disclosed in Preparation Example 9 was plated with zinc by repeating the plating process disclosed in Example 7 thrice. Next, the solid was analyzed by scanning electron microscope (SEM) and transmission electron microscope (TEM), and the density of the solid was measured and is shown in Table 6 according to SEM and TEM spectra.

TABLE 6

| | $ZnCl_2$ | $NaC_6H_8O_7$ | $NH_4Cl$ | pH | reducing agent $(Na_2HPO_2)$ | number of plating times | density $(g/cm^3)$ |
|---|---|---|---|---|---|---|---|
| Example 7 | 0.4M | 1M | 0.6M | 4 | 0.4M | 1 | 3.98 |
| Example 9 | | | | | | 2 | 4.06 |
| Example 10 | | | | | | 3 | 5.01 |

As shown in Table 6, the thickness of the zinc layer is directly proportional to the number of plating times. Furthermore, the density of the solid (the particle covered with the zinc/nickel composite layer) is also increased as the number of plating times increases.

Example 11

Example 11 was performed in the same manner as in Example 7 except for substituting hydrazine ($N_2H_4$, 0.0156M) for disodium hydrogen phosphate ($Na_2HPO_2$, 0.4M), obtaining the solid (the polystyrene particle covered with a zinc/nickel composite layer). Next, the solid was analyzed by scanning electron microscope (SEM) and transmission electron microscope (TEM), and the density of the solid was measured and is shown in Table 7 according to SEM and TEM spectra.

Example 12

Example 12 was performed in the same manner as in Example 7 except for substituting hydrazine ($N_2H_4$, 0.156M) for disodium hydrogen phosphate ($Na_2HPO_2$, 0.4M), obtaining the solid (the polystyrene particle covered with a zinc/nickel composite layer). Next, the solid was analyzed by scanning electron microscope (SEM) and transmission electron microscope (TEM), and the density of the solid was measured and is shown in Table 7 according to SEM and TEM spectra.

TABLE 7

| | $ZnCl_2$ | $NaC_6H_8O_7$ | $NH_4Cl$ | pH | reducing agent | density $(g/cm^3)$ |
|---|---|---|---|---|---|---|
| Example 7 | 0.4M | 1M | 0.6M | 4 | $Na_2HPO_2$ 0.4M | 3.98 |
| Example 11 | | | | | $N_2H_4$ 0.0156M | 3.72 |
| Example 12 | | | | | $N_2H_4$ 0.156M | 3.83 |

The solid (the polystyrene particle covered with a zinc/nickel composite layer) can be obtained when replacing the disodium hydrogen phosphate with hydrazine. As shown in Table 7, the thickness of the zinc layer is directly proportional to the concentration of the hydrazine. Furthermore, the density of the solid (the particle covered with the zinc/nickel composite layer) is also increased as the concentration of the hydrazine increases.

Preparation Example 12

Carbon fiber (available from the SGL Carbon Corporation) was added into a hydrothermal synthesis reactor. Next, concentrated nitric acid (16M) was added into the reactor, and the carbon fiber was bathed in the concentrated nitric acid. Next, the reactor was heated at 180° C. for 16 hours. Next, the carbon fiber was collected by filtration, and washed with water to remove the remaining nitric acid. After drying, an acidified carbon fiber was obtained.

Example 13

Figure 5:
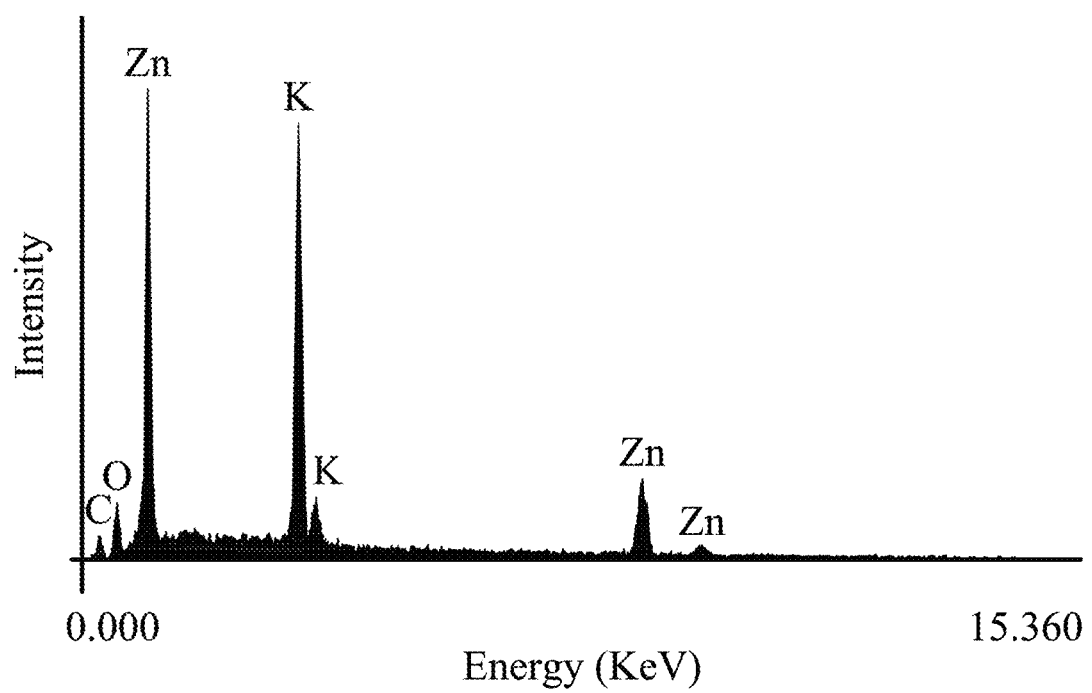
FIG. 5 is an energy dispersive X-ray (EDS) spectrum of the carbon fiber coated with a zinc metal layer as disclosed in Example 13.

The acidified carbon fiber disclosed in Preparation Example 12 was bathed in potassium hydroxide (KOH) solution. The carbon fiber was subjected to an electroplating with the zinc sheet as cathode electrode and the stainless steel sheet (316 stainless steel) as anode grid at a specific current (1.0 Amp) and voltage (4.0 V), in order to form a zinc layer on the surface of the carbon fiber. After 30 minutes, the carbon fiber coated with the zinc layer was collected, and then washed with deionized water to remove the remaining lye. Next, the carbon fiber coated with the zinc layer was dried at 80° C. for 24 hours, obtaining the solid (carbon fiber covered with the zinc layer) Next, the solid was observed by scanning electron microscope (SEM) and the SEM spectrum of the solid was shown in FIG. 4. Next, the solid was analyzed by transmission electron microscope (TEM) to measure the density thereof. The average density of the solid was about 1.40±0.5 g/cm$^3$ (depending on the ratio between the carbon fiber and zinc). Next, the solid was analyzed by energy dispersive X-ray spectrometers (EDS) for defining element contents, and the EDS spectrum of the solid was shown in FIG. 5. As shown in FIG. 5, the EDS spectrum shows that the zinc single is a major peak, thereby conforming that there is a zinc layer formed on the surface of the carbon fiber.

Metal-Air Battery

Example 14

Figure 6:
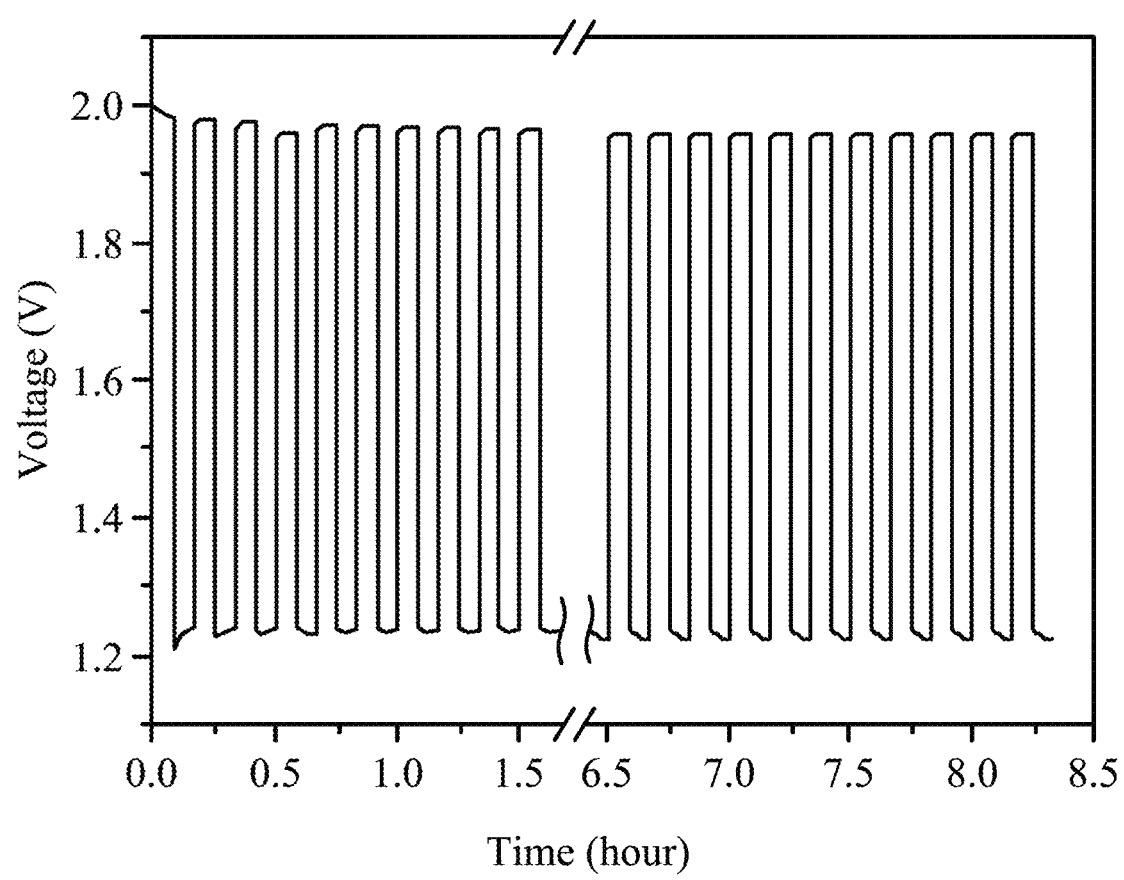
FIG. 6 shows the curve made by subjecting the metal-air battery of Example 14 to a charge/discharge cycle test.

The air side plate, air side collector grid, air electrode, air side electrolyte channel, isolation membrane, metal side electrolyte channel, metal side collector grid, and metal electrode were provided, and then combined to obtain a metal-air battery. The side plate and the electrolyte channel were made of acrylic resin. The air electrode was prepared by subjecting teflon (serving a waterproof breathable layer to avoid leakage of the electrolyte), foam nickel, carbon black (serving as catalyst carrier to enhance the conductivity and to spread air evenly), and chrome catalyst to a thermal pressing process, wherein the air entered the air electrode to react with the catalyst. The membrane (such as nonwoven isolation membrane) was disposed between the air electrode and the metal electrode to avoid a short circuit therebetween. In addition, the carbon fiber covered with the zinc layer (disclosed in Example 13) was filled into the metal side electrolyte channel, and an electrolyte (with a solution density of 1.45 g/cm$^3$) including water and potassium hydroxide (KOH, 6M) was filled into the air side electrolyte channel by a peristaltic pump, wherein the electrolyte passed through the isolation membrane to fill the voids of the carbon fiber in the metal side. After infiltrating the isolation membrane and carbon fiber with the electrolyte, the metal-air battery was subjected to a charge/discharge cycle test (measured by Kikusui PFX2011) (at 10 mA/cm$^2$ for 50 cycles), and the result is shown in FIG. 6, The metal-air battery exhibited a charging voltage of about 1.96V, discharging voltage of 1.22V, and a charge/discharge voltage efficiency of 62.2%.

Comparative Example 1

Comparative Example 1 was performed in the same manner as in Example 14 except for replacing the zinc metal powder with carbon fiber covered with zinc layer, obtaining the metal air battery. Next, the metal-air battery was subjected to a charge/discharge cycle test (measured by Kikusui PFX2011), and the metal-air battery exhibited a charge/discharge voltage efficiency of 50%.

It will be clear that various modifications and variations can be made to the disclosed methods and materials. It is intended that the specification and examples be considered as exemplary only, with the true scope of the disclosure being indicated by the following claims and their equivalents.

What is claimed is:

1. An electrolyte composition, comprising:
   a solid with a core-shell structure, wherein the solid includes a substrate serving as a core and a metal layer covering the substrate, and wherein the metal layer is selected from a group consisting of Zn, Al, Mg, Li, Na and metal oxides thereof; and
   a solution, wherein the solid has a first density, and the solution has a second density, and wherein the ratio between the first density and the second density is from about 0.97 to 1.03.

2. The electrolyte composition as claimed in claim 1, wherein the solid has a spherical shape, elongated shape, polyhedral shape, or a combination thereof.

3. The electrolyte composition as claimed in claim 2, wherein the solid has a spherical shape and has a sphericity of between 0.4 and 1.

4. The electrolyte composition as claimed in claim 3, wherein the substrate has a particle size of between 50 nm and 10 μm.

5. The electrolyte composition as claimed in claim 1, wherein the substrate is a conductive material.

6. The electrolyte composition as claimed in claim 5, wherein the conductive material is a conductive polymer, carbon material, or a combination thereof.

7. The electrolyte composition as claimed in claim 6, wherein the conductive polymer is polyaniline, polyphenylene sulfide, polypyrrole, poly(p-phenylene, polythiophene, poly(p-phenylene vinylene), polyfluorene, polyacetylene, or a combination thereof.

8. The electrolyte composition as claimed in claim 6, wherein the carbon material is carbon nanotube, carbon capsule, carbon fiber, or a combination thereof.

9. The electrolyte composition as claimed in claim 1, wherein the substrate is a non-conductive material.

10. The electrolyte composition as claimed in claim 9, wherein the non-conductive material is polymer material, inorganic material, or a combination thereof.

11. The electrolyte composition as claimed in claim 10, wherein the inorganic material is titanium oxide, zirconium oxide, silicon oxide, zeolite or a combination thereof.

12. The electrolyte composition as claimed in claim 10, wherein the polymer material is polycarbonate, polyethylene terephthalate, polyethylene, polyvinylchloride, polypropylene, polyacrylonitrile, phenol-formaldehyde resin, melamine formaldehyde resin, polystyrene, polymethyl methacrylate, or a combination thereof.

13. The electrolyte composition as claimed in claim 1, further comprising a conductive layer disposed between the substrate and the metal layer.

14. The electrolyte composition as claimed in claim 13, wherein the conductive layer is made of Ni, Ti, Sn, or conductive polymer.

15. The electrolyte composition as claimed in claim 1, wherein the first density of the solid is from 1.5 to 6.

16. The electrolyte composition as claimed in claim 1, wherein the second density of the solution is from 1.455 to 6.18.

17. The electrolyte composition as claimed in claim 1, wherein the solution comprises a solvent, and a solute, wherein the solute is metal oxide compound, alkaline compound, or a combination thereof.

18. The electrolyte composition as claimed in claim 17, wherein the solvent comprises water.

19. The electrolyte composition as claimed in claim 17, wherein the alkaline compound is sodium carbonate, potassium carbonate, sodium bicarbonate, sodium hydroxide, potassium hydroxide, tetra-methyl ammonium hydroxide, or a combination thereof.

20. The electrolyte composition as claimed in claim 17, wherein the metal oxide compound comprises zinc oxide, aluminum oxide, magnesium oxide, lithium oxide, sodium oxide, or a combination thereof.

21. An energy storage device, comprising:
   an anode;
   a cathode;
   an isolation membrane disposed between the anode and the cathode; and
   the electrolyte composition as claimed in claim 1.

* * * * *